Nov. 21, 1933.　　R. F. DICKSON　　1,936,351
DECORATED PLASTIC SHEETING
Filed Dec. 12, 1931

Robert F. Dickson INVENTOR.
BY Harold A. Kingsbury
his ATTORNEY

Patented Nov. 21, 1933

1,936,351

UNITED STATES PATENT OFFICE 1,936,351

DECORATED PLASTIC SHEETING

Robert F. Dickson, Leominster, Mass., assignor to Dupont Viscoloid Company, Wilmington, Del., a corporation of Delaware Application December 12, 1931
Serial No. 580,722

2 Claims. (Cl. 18—57)

This invention relates to decorated plastic sheeting, for example cellulose ester (e. g cellulose nitrate or acetate) or cellulose ether plastic sheeting, and more particularly to the finishing of sheeting for use in the wood heel covering trade. It is of particular virtue in the production of plastic sheeting having finishes which harmonize with grained shoe leathers or textile fabrics.

It has heretofore been proposed to make imitations of grained leathers on plastic sheeting by embossing the cellulose plastic sheet, either between plates one of which contains the design, or passing the sheet between embossing rolls one of which is usually heated. The embossing is usually done on the standard sized commercial sheet, e. g. 20″ x 50″ known to the cellulose plastic art. There are, however, major difficulties with these prior processes. The plates or rolls are very costly; the finish on the plates is very perishable; and in use they become scratched or marred in ways which destroy their usefulness. Furthermore, the finish produced by embossing is frequently damaged in the subsequent handling of the plastic sheets. Also, the plastic sheets finished in this way, when blanked preparatory to placing over the heel, have a faculty of losing the grained effect and returning to their original appearance. This occurs particularly during or subsequent to the softening bath treatment which is used to soften the plastic blank just prior to covering the wood heel. The embossing roll is of longer usefulness than the embossing plate (and more costly too); but the embossment produced by this method is no less perishable than that produced by the plate method.

The present invention provides a method whereby plastic having finishes harmonizing with grained leathers and textile fabrics and suitable for application in the wood heel trade may be produced in a relatively imperishable form and at a relatively low cost, thus making such plastic particularly desirable in this industry.

One object of the invention is to provide a procedure for the production of plastic sheets having a uniform effect harmonizing with grained leather and textile fabrics throughout the length and width of the sheet. It has as its further object to provide a decorated sheet with a decoration which, to all practical purposes, is imperishable on application to the heel. To these ends and also to improve generally upon methods and products of the general character indicated, the invention consists in the various matters hereinafter described and claimed.

Figure 1:
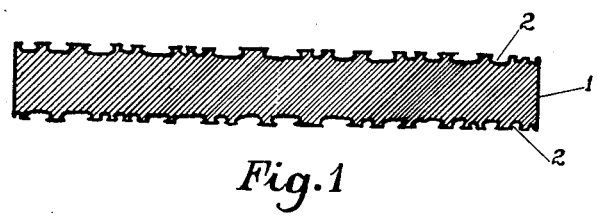
Figure 2:
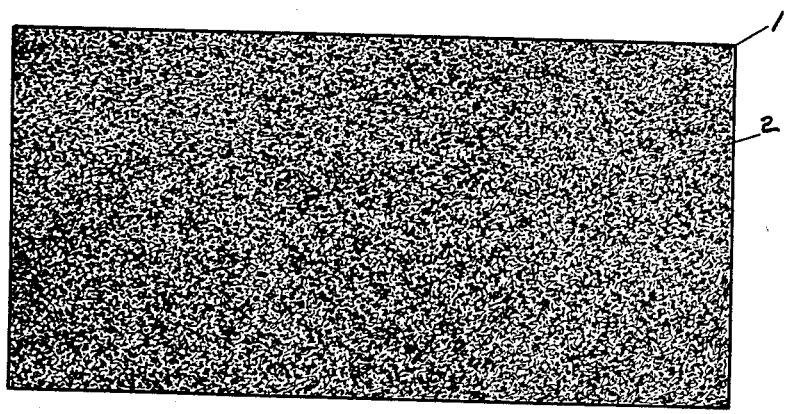

In the accompanying drawing Figure 1 is a cross sectional view and Figure 2 a face view, both somewhat conventional and exaggerated, of a sheet in accordance with my invention.

I have found that a finish which will harmonize with grained leather and textile fabrics and which is highly desirable for use in the wood shoe heel covering trade may be produced on a plastic sheet preferably of cellulose ester or ether by a sheeting or cutting operation. In general accordance with my invention the cellulose derivative plastic may be prepared with any of the regular compositions known to the plastic sheeting art, for use in the wood shoe heel covering trade. It may be colored to match the leather or textile of the shoe and may or may not contain pigment. Such compositions and colors are of course known to those skilled in the art.

The composition is colloided and rolled and the sheets from the rolls welded into a block in a cake press. I prefer that the block of plastic, ready for production of decorated sheets in accordance with the invention, have a solvent content of 18% but the same may vary from 15% to 20%. A specimen composition may be, for example, cellulose nitrate 100, plasticizer (e. g. camphor) 33, softener (e. g. fusel oil) 8, solvent (e. g. alcohol) in the specified percentage of the mixture, and such coloring matter as desired.

Proceeding to the production of the decorated sheets, the block is severed horizontally into thin layers, using a knife that in particular accordance with the invention is dulled, the depth of the decoration depending upon the degree of dullness, the duller the knife the deeper the decoration. This proper dullness is preferably obtained by first sharpening the blade to a razor-like edge, as by preliminary sharpening with a carborundum stone (the ordinary No. 115 sharpening stone used in this art), finishing off the edge with a natural stone of extreme hardness, (e. g. "Arkansas Stone"), and then uniformly dulling it throughout its length by passing a carborundum stone as specified above, flatwise directly along and at right angles to the edge of the knife. As to the degree of dullness, the dulled cutting edge of the knife may vary from, say, a thickness of .0005 inch to a thickness of .004 inch, depending on the depth of decoration desired; and also depending on the thickness of the sheet since, obviously, a design should not be so deep as to penetrate entirely through the sheet. (Sheets are ordinarily about .0125 inch thick.) In cases where a finish which will harmonize with a very fine grained or weave effect is wanted, it is necessary to dull the knife only to a slight extent. If, however, the coarse grain is desired, it is necessary to dull the knife to a considerable extent.

With the knife in this condition, the block of stock is forced against the dulled edge and the surface of the sheet as it is being removed from the block by the knife is, by the knife, given a rough and irregularly and superficially pitted surface, thereby producing the desired roughened decorative effect over the entire surface of the sheet. It will be understood by those skilled in the art that it is not possible to continue the use of this knife indefinitely and produce a satisfactory sheet. It will be found in following out the intent of this invention that after sheeting a number of sheets it will be necessary to remove the knife and resharpen and re-dull it, before proceeding.

For cutting the block into sheets any suitable machine may be employed such as reciprocating "planing" or sheeting machine of the character employed in production of pyroxylin plastic. Any suitable device or devices may be employed for applying heat to the surface of the block if necessary. In practicing my invention, assuming that one starts with an empty sheeting machine and places on the base plate thereof a block of plastic, securing the same to the said base plate, it is preferable to then remove the topmost portions of the block, and level the same with a sharp knife. This is to so prepare the block that the top surface of the same shall have a smooth, uniform appearance. The block having been thus prepared, the cutting of the sheets therefrom with a dulled knife in accordance with the invention is proceeded with. The sheets as produced are, of course, decorated on both surfaces. In the drawing the sheet 1 is shown provided with the decorative irregular and superficial pits 2, the sheet being exaggerated in thickness and the are and depth of the pits being also exaggerated.

The sheets produced in accordance with my invention may be seasoned in ways commonly practiced in the cellulose plastic industry. However, I prefer to season the sheets considerably less than one would season sheets produced and sheeted in the regular way, but sufficiently to harden the sheets to fix and preserve the decoration. That is, the residual solvent may be 1.5 percent. This is because the decoration of the sheet produces a non-uniformity in thickness and if the thin portions are too well seasoned there will be a tendency to brittleness in subsequent handling of the sheet. For covering shoe heels the sheets are blanked into individual covers, and the covers applied to the heels in any approved way.

Advantages of the invention are that it produces a plastic sheet with a surface that harmonizes with the grain of leather and with textile fabric weaves used in the shoe industry. Finishes in accordance with the invention are less costly to produce than are finishes produced by either the embossed plate or roll method. It produces a decorated sheet whose decoration is less perishable than that of sheets produced by other methods. It produces sheets which do not stick together in the blank form in the softening bath customary to use in the wood-heel trade.

In Figure 1 the decoration is greatly exaggerated, while in Figure 2 it is illustrated approximately four-times size.

I claim:

1. The method of producing a decorated sheet comprising passing a separating blade through a body of plastic to divide a sheet therefrom, said blade having its operating edge sufficiently dulled to thereby give the face of the separated sheets a roughened irregularly and superficially pitted surface, as disinguished from a surface with but sheeter lines, the so roughened and pitted surface being thus in itself decorative.

2. The method of producing a decorated cellulosic plastic sheet comprising passing a separating blade through a block of plastic containing sufficient solvent to permit such operation, said blade having its operating edge of a thickness substantially between .0005 and .004 inch, thus to impart to the face of the sheet a roughened irregularly and superficially pitted surface, as distinguished from a surface with mere sheeter lines, the so roughened and pitted surface being thus itself decorative, and seasoning the separated sheet to fix in the surface thereof the decorative irregularities produced by said blade.

ROBERT F. DICKSON.